United States Patent [19]
Furlani et al.

[11] Patent Number: 6,064,408
[45] Date of Patent: May 16, 2000

[54] METHOD, APPARATUS AND COMPUTER PROGRAM PRODUCT FOR ELIMINATING EDGE CONDITIONS FROM AN AREA IMAGE PROCESSING OPERATIONS ON TILED IMAGE DATA

[75] Inventors: John L. Furlani; Alexandra R. Ohlson, both of Palo Alto, Calif.; David T. Berry, Impington, United Kingdom

[73] Assignee: Sun Microsystems, Inc., Mountain View, Calif.

[21] Appl. No.: 09/067,658

[22] Filed: Apr. 28, 1998

[51] Int. Cl.[7] ......................................... G06F 13/00
[52] U.S. Cl. ................................. 345/523; 707/104
[58] Field of Search ........................... 345/501, 523–525, 345/507–509; 711/170–173; 707/104

[56] References Cited

U.S. PATENT DOCUMENTS

| | | | |
|---|---|---|---|
| 5,263,136 | 11/1993 | DeAguiar et al. | 345/511 |
| 5,461,706 | 10/1995 | Trow et al. | 345/425 |

OTHER PUBLICATIONS

"Appendix C Alphabetical List of IA MMX™ Instruction Set Mnemonics," Internet address: http://134.134.214.1/drg/mmx/manuals/prm/prm_appc.htm (published prior to the filing of the application) 1–3.

"Intel Architecture MMX™ Instruction Set," Internet address: http://developer.intel.com/drg/mmx/Manuals/prm/PRM_CHP5.HTM (published prior to the filing of the application) 1–33.

"The VIS™ Instruction Set," Internet address: http://www.sun.com/microelectronics/vis/ (published prior to the filing of the application) 1–3.

"The Visual Instruction Set (VIS™): On Chip Support for New–Media Processing," Internet address: http://www.sun.com/microelectronics/whitepapers/wp95–022/ (published prior to the filing of the application) 1–9.

Sun Microsystems VIS™ Instruction Set User's Manual, 1–136, (Jul. 1997).

"Why is a PC not a Workstation? Because it is VIS™–ually impaired," Internet address: http://search.sun.com/query.html?col=service&col=sun&col=swol&col=wwwwest&qp=&qt=VIS&qs=&qc=&pw=455&ws=0&qm=0&st=1&nh=10&lk=1&rf=0&oq=&rq=0 (published prior to the filing of the application) 1–3.

*Primary Examiner*—Kee M. Tung
*Attorney, Agent, or Firm*—Sabath & Truong

[57] ABSTRACT

Apparatus, methods, and computer program products are disclosed for reducing the overhead associated with performing area-image operations on a tiled image. The invention detects when an area-image operation, that uses a source pixel contribution map, requires pixel values from one or more adjacent tiles. The invention also generates a list of boxes that represent pixel image information. These boxes are split with respect to the image edges and the tile edges within the image. The split boxes are used to direct memory buffer allocation for cobbled portions of the image and to leave the majority of the tile's pixel information to be operated on within memory buffer holding the tile. Thus, the invention provides a mechanism to assemble image data that crosses tile edges without copying major portions of the tile from one memory buffer to another. Additionally, each resulting box represents sufficient pixel values such that existing image processing techniques currently are applied to area-image operations can also be applied to tiled images. Thus, box can be processed by an MMX-like instruction or image hardware accelerator.

22 Claims, 11 Drawing Sheets

Fig. 6B

METHOD, APPARATUS AND COMPUTER PROGRAM PRODUCT FOR ELIMINATING EDGE CONDITIONS FROM AN AREA IMAGE PROCESSING OPERATIONS ON TILED IMAGE DATA

BACKGROUND OF THE INVENTION

1. Field of the Invention

This invention relates to the field of performing image operations on tiled images. Specifically, this invention is a method, apparatus, and computer program product for efficiently processing area-image operations that operate on a source image that extends across multiple tiles.

2. Background

Image based computer applications generally apply a selection of image operations to an input source image to generate an output destination image. These image operations include area-image operations. Area-image operations are those that generate a destination pixel by using contributions from more than one source pixel. The images operated on by these applications are often very large—typically from tens of megabytes to many gigabytes or more. Often the size of the image is larger than the volatile memory available to store the image. To process such a large image, the image is generally "tiled" so that only a portion (one or more tiles) of the image is in memory at a particular time.

To generate a destination tile, multiple source tiles often need to be accessed. This need is particularly true with "area" operations. Area-image operations are those that generate a destination pixel by using contributions from more than one source pixel. Some area-image operations apply values from a source pixel contribution map (such as a kernel array) to corresponding pixel values in one or more source tiles to generate a destination pixel value having contributions from each of the corresponding pixel values in the source tiles.

One problem with the area-image operations that are applied near a tile edge is that these area-image operations need source pixel value information from an adjacent tile to calculate each source pixel's contribution per the source pixel contribution map. In addition, the programming that implements the area-image operations is complicated by the need to provide "special-case" programming to process the edge conditions of the tile. This approach directly accesses pixel values in the tiles. However, this approach is very complex and cannot readily be implemented using specialized image processing hardware or specialized CPU instructions such as Sun's VIS or Intel's MMX accelerated CPU-based instruction sets. Thus, the prior art assembles a memory buffer containing sufficient pixel values so that the buffer can be processed using the accelerated hardware or specialized CPU instructions. Another prior art approach to process tiles is to simply not use the accelerated hardware or specialized CPU instructions and suffer the reduced performance.

The construction of the memory buffer using information assembled from the source tile and adjacent source tiles consumes computer resources. The term "cobbling" refers to the process of assembling such a buffer. For example, one prior art approach to this problem is to read every source tile that contains any of the image data required to generate the pixel values in the destination into a contiguous buffer in memory. This approach consumes large contiguous amounts of memory. Another prior art approach is to first create a temporary memory buffer that is just large enough to hold all the necessary source pixel values required for the image operation. Then, to copy the appropriate source pixel values from the multiple tiles to the temporary memory buffer. Once in the memory buffer, the pixel values can be processed as a whole. Although this approach reduces the amount of contiguous memory, the overhead of copying complete tiles from one memory buffer to another is significant. Yet another prior art approach is to store the source tiles with overlapping boarders (containing pixel values from other tiles) to provide the pixel values required by the source pixel contribution map. Thus, every tile consumes more memory that would otherwise be required. These approaches all require significant memory or tile disk access overheads to cobble together memory buffers that are suitable for area-image operations. In addition, image accelerator devices (such as MMX-like computer instructions or other specialized image processing hardware) do not have the capability of performing area-image operations across tile edges and thus are tile-unaware.

It would be advantageous to provide methods, mechanisms, and computer program products that permit area-image operations to be efficiently applied to tiled images. Thus, it would be advantageous to use graphical accelerator devices, image processing computer instructions or some combination thereof on tiled images. In addition, it would be advantageous to use tile-unaware technology to process tiled images. It would also be advantageous to reduce the overhead related to creating these memory buffers and to reduce the number of special-case conditions within the processing code. These techniques also improve the efficiency of a computer that performs such area-image operations. The efficiency is improved by reducing the amount of pixel data that is copied from one memory buffer to another by the area-image operation and by improving the efficiency of the executing area-image operation code.

SUMMARY OF THE INVENTION

The present invention improves the efficiency of cobbling together memory buffers suitable for area-image operations. One aspect of the invention generates a list of boxes that represent pixel image information. These boxes are split with respect to the image edges and the tile edges within the image. The split boxes are used to direct memory buffer allocation for cobbled portions of the image and to leave the majority of the tile's pixel information to be operated on within the memory buffer holding the actual tile's pixel values. Thus, the invention provides a mechanism to assemble image data that crosses tile edges without copying major portions of the tile from one memory buffer to another. The invention also provides techniques that allow prior art area-image operation implementations to be applied to tiled images. These techniques include creating separate small buffers that contain the source pixel values required for area operations near tile edges and then using prior art area-image operation implementations to operate on the source pixel values in the buffers.

One aspect of the invention is a computer-controlled method for generating a destination image by application of an area-image operation that uses a source pixel contribution map parameter to process a tiled source image. The method includes the step of creating a plurality of boxes representing a destination region and a source region. Each of the plurality of boxes is respectively identified as either a source box or a destination box. Another step is of splitting the plurality of boxes so that each of the plurality of boxes does not extend across a tile edge. An additional step is that of creating a source tile edge box extending across the tile edge. The source tile edge box is dependent on the source pixel contribution map parameter.

Another aspect of the invention is an apparatus, having a central processing unit (CPU) and a memory coupled to the CPU, for generating a destination image by application of an area-image operation that uses a source pixel contribution map parameter to process a tiled source image. The apparatus includes a box creation mechanism that is configured to create a plurality of boxes representing a destination region and a source region. Each of the plurality of boxes is respectively identified as either a source box or a destination box. The apparatus also includes a box splitting mechanism that is configured to split the plurality of boxes created by the box creation mechanism so that each of the plurality of boxes does not extend across a tile edge. The apparatus also includes an edge box creation mechanism that is configured to create a source tile edge box, dependent on the source pixel contribution map parameter. The source tile edge box extends across the tile edge. The edge box creation mechanism is responsive to the box splitting mechanism.

Yet a further aspect of the invention is a computer program product, embodied on a computer usable medium, having computer readable code embodied therein. The computer readable code causes a computer to generate a destination image by application of an area-image operation that uses a source pixel contribution map parameter to process a tiled source image. When executed on a computer, the computer readable code causes a computer to effect a box creation mechanism, a box splitting mechanism and an edge box creation mechanism. Each of these mechanisms having the same functions as the corresponding mechanisms for the previously described apparatus.

Another aspect of the invention is a computer program product embodied in a carrier wave transmitting computer readable code therein for causing a computer to generate a destination image by application of an area-image operation that uses a source pixel contribution map parameter to process a tiled source image. When executed on a computer, the computer readable code causes a computer to effect a box creation mechanism, a box splitting mechanism and an edge box creation mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE DRAWINGS

FIG. 6B illustrates box types that are used in accordance with a preferred embodiment;

DESCRIPTION OF THE PREFERRED EMBODIMENTS

Notations and Nomenclature

The following 'notations and nomenclature' are provided to assist in the understanding of the present invention and the preferred embodiments thereof.

Box—A box is a data structure that represents a portion of the image and can be used to determine the amount of memory needed to store the pixel values represented by the box. As is subsequently described, boxes may be typed.

Box list entry (BLE)—A BLE is a data structure that references the source boxes processed by an image operation to generate a destination box.

Boxlist—A boxlist is a data structure that is an ordered association of one or more BLEs.

Cobbling—The process of assembling non-contiguous data areas (or buffers) into a contiguous data area (for example, assembling portions of an assortment of tiles into a single buffer).

Data structure—A data structure is an ordered arrangement of storage in memory for information.

Image edge—An image edge is the end of the image data. The image edge may occur within a tile.

Pointer—A pointer is a data value that is used to reference a data structure or an object. One skilled in the art will understand that "pointer" includes, without limitation, a memory address to, or a value used to calculate the address to the information of interest and any functional equivalents including handles and similar constructs.

Procedure—A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Tile—A tile contains image data. Generally, an image is composed of multiple tiles. Each pair of adjacent tiles is separated by a tile edge. A tile is generally stored in a contiguous memory buffer when the tile is resident in memory.

Operating Environment

Figure 1:
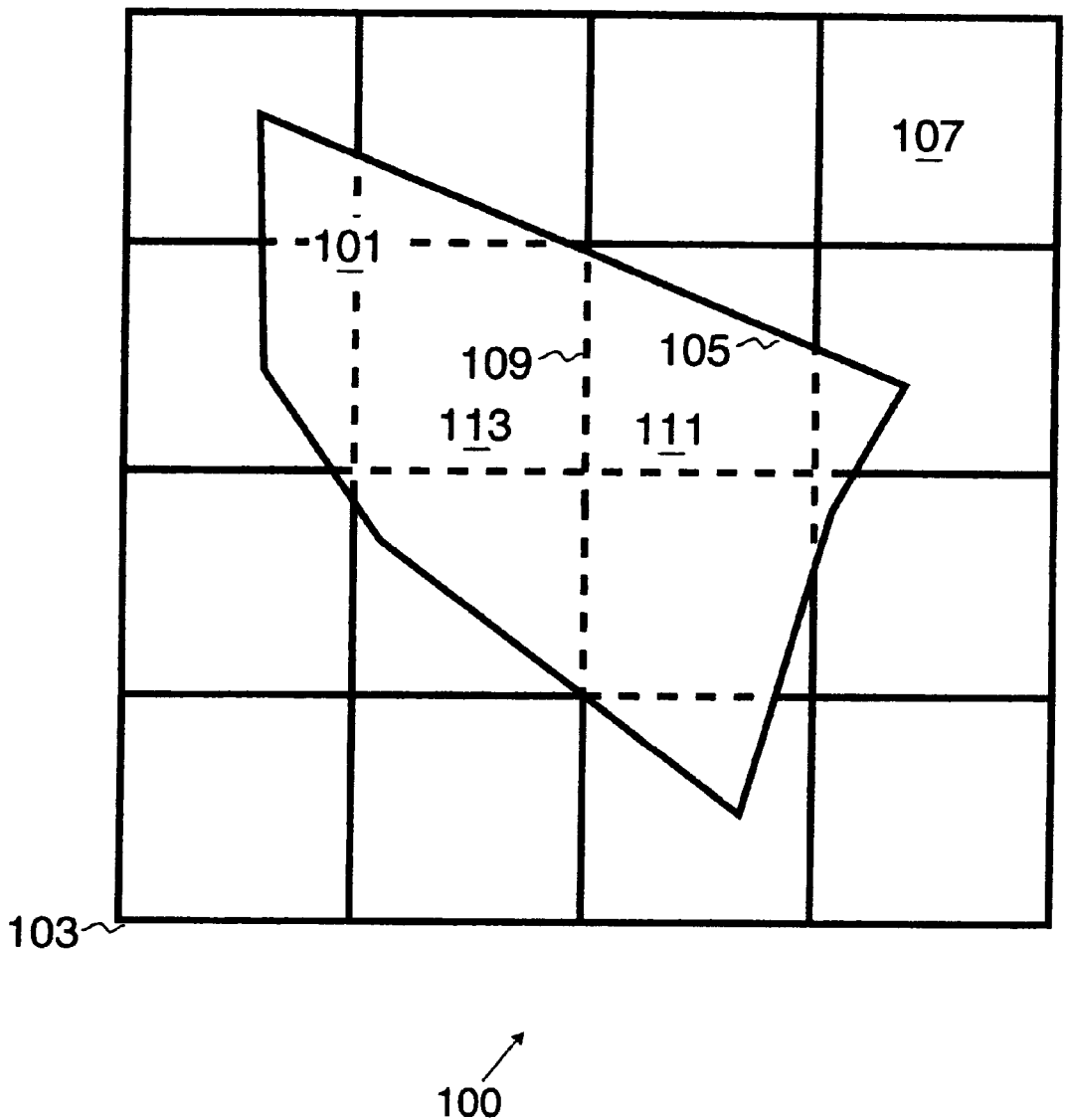
FIG. 1 illustrates a prior art tiled image.

Because the invention is used to process tiled images, it is useful to provide an overview of the use of tiled images. FIG. 1 illustrates a prior art tiled image, indicated by general reference character 100. A region 101 is contained within a 4×4 tile array 103. The region 101 has a region edge 105. Each tile in the tiled image 100 contains pixel data that can be used to present the image to a user on a display device, a printer device, or other similar device. Image operations are performed on the tiled image 100 by specifying the region 101 to be affected by the image operation and then applying the image operation to the pixel data in the tiles within the region. An unaffected tile 107 is outside of the region edge 105. Thus, the pixel data in the unaffected tile 107 will not need to be brought into memory, as it is not subject to the image operation applied to the region 101. However, each tile that contains pixel data that will be processed by the image operation will eventually need to be brought into memory. If the image operation is an area-image operation that uses a source pixel contribution map that extends across a tile edge 109 separating a tile 111 and a tile 113, pixel data from both the tile 111 and the tile 113 is required to generate the resultant destination pixel data. Pixel data will henceforth be referred to as a pixel value or as pixel values.

Figure 2:
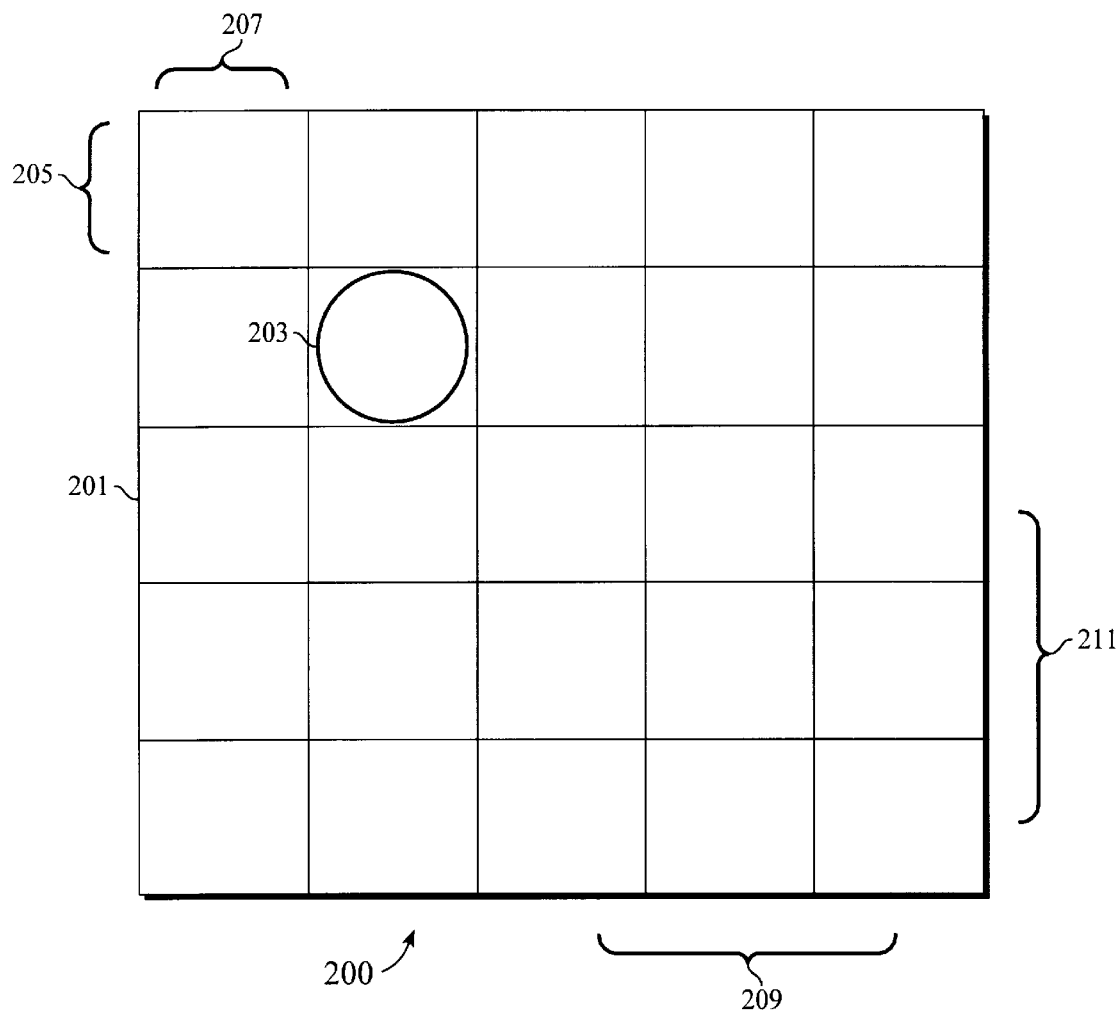
FIG. 2 illustrates a prior art source pixel contribution map used with an area-image operation that is applied to a source image.

Area-image operations operate on a number of pixel values (as specified by a source pixel contribution map) in a source tile to generate a single pixel value in a destination tile. FIG. 2 illustrates a prior art source pixel contribution map, indicated by general reference character 200 that includes a 5×5 array of adjustment values 201 and a key value 203. Area-image operations use the adjustment values in the source pixel contribution map 200, as applied to corresponding pixel values in a source image, to determine the value of a destination pixel value in the destination image. The source pixel contribution map 200 can be of arbitrary size and need not be square or contiguous. The source pixel contribution map 200 need not be an array and may be represented by other data structures well known in the art. The source pixel contribution map 200 can be parameterized with respect to the key value 203. The source pixel contribution map parameters include a top edge dimension 205, a left edge dimension 207, a right edge dimension 209, and a bottom edge dimension 211. One skilled in the art will understand that the value of a destination pixel value is a function of the values of the source pixels and the values in the source pixel contribution map 200. That is, the source pixel contribution map 200 is positioned over the source image such that the key value 203 overlaps the source pixel that maps to the destination pixel whose value is being determined. Then, each source pixel value, as modified by the corresponding adjustment value, contributes to the value of the destination pixel. Image convolution is an example of an area-image operation that uses the source pixel contribution map 200 in this manner.

One problem using the source pixel contribution map 200 on a tiled image (such as shown in FIG. 1) occurs when a portion of the source pixel contribution map 200 extends across a tile edge. In this circumstance, additional pixel value information must be brought into memory from tiles other than the tile containing the key value 203 so that the area-image operation using the source pixel contribution map 200 will perform correctly. As was previously discussed in the background section, this is a high overhead operation that is difficult to accelerate. An example of the problem is subsequently shown in FIG. 3. The invention solves this problem.

Figure 3:
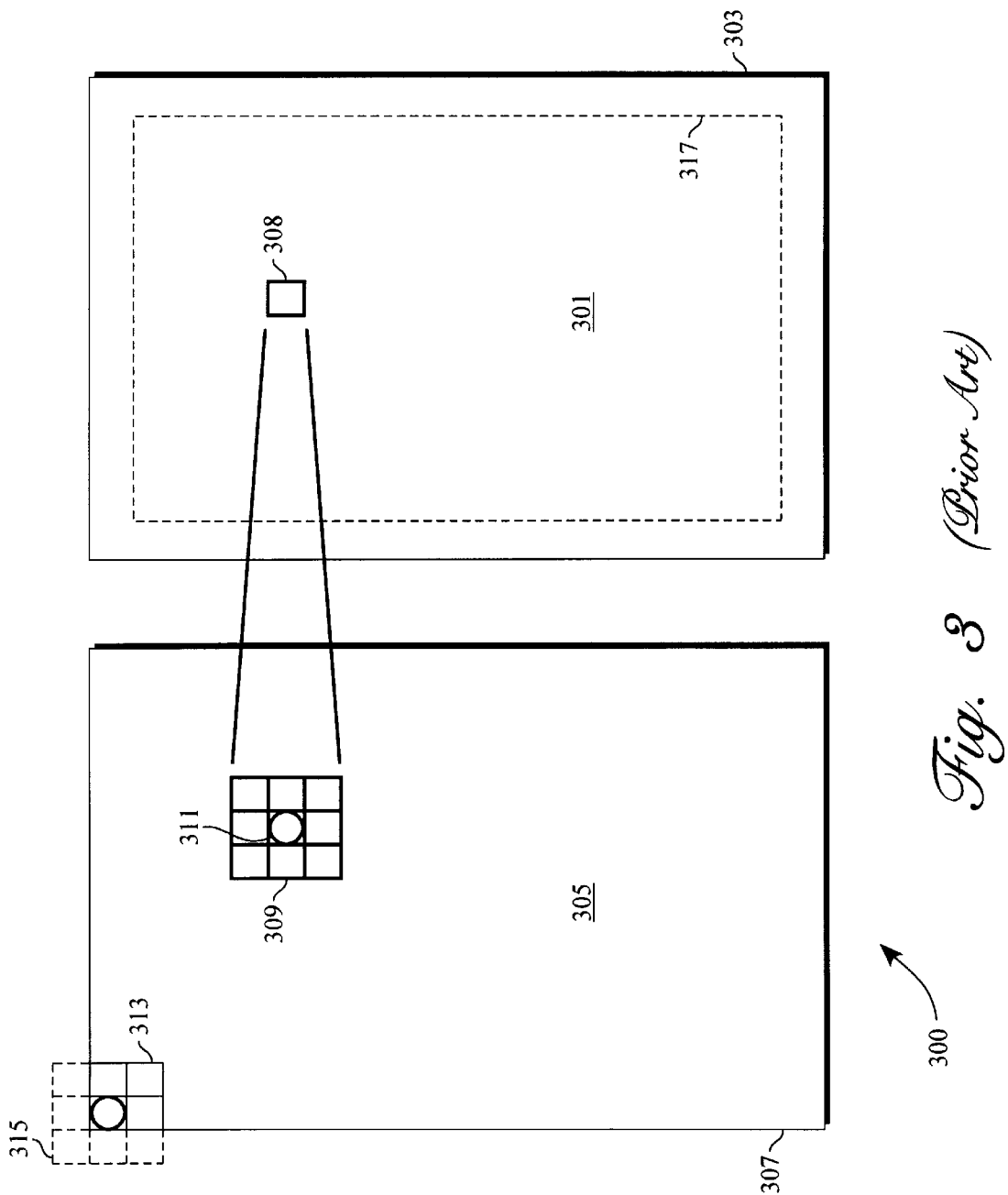
FIG. 3 illustrates an area-image operation that generates a destination tile from a source tile in the prior art.

FIG. 3 illustrates prior art source and destination tiles, indicated by general reference character 300, that demonstrate a problem solved by the invention. A destination tile 301 has a destination tile edge 303 and contains pixel values. The value of pixels in the destination tile 301 is the result of an area-image operation that, for example, operates on pixel values within a source tile 305 and an adjacent source tile. The source tile 305 has a source tile edge 307. An area-image operation uses the adjustment values from a source pixel contribution map 309 and the corresponding pixel values from the source tile 305 to generate a destination pixel value 308 in the destination tile 301. The source pixel contribution map 309 contains a key value 311. The source pixel contribution map 309 and the key value 311 were previously described with respect to FIG. 2. The source pixel contribution map 309 is not fully realized when it is located near the source tile edge 307 as shown by a partial source pixel contribution map 313. The partial source pixel contribution map 313 can only be applied to a portion of the source image pixel values required to generate the destination pixel because the partial source pixel contribution map 313 is positioned such that some of the source pixel contribution map's adjustment values extend beyond the source tile edge 307. An example of such an adjustment value is an 'out-of-tile' adjustment value 315. Thus, a center boundary 317 exists in the destination tile 301 beyond which pixel values cannot be processed from pixel values solely within the source tile 305. One approach the prior art uses to address this problem is by first allocating a buffer that can contain the source tile 305 and portions of adjacent tiles. Then, copying the contents of the source tile 305 and the appropriate portions of the adjacent source tiles to the allocated buffer. Once the allocated buffer is loaded, the area-image operation can proceed. One skilled in the art will understand that copying the tile data consumes significant computer resource and that the performance of a computer performing such area-image operations will be improved by reducing the amount of pixel values that are copied.

The invention efficiently processes area-image operations that operate on a source image that extends across multiple tiles by reducing the cobbling required to process destination pixel values beyond the center boundary 317. Thus, the invention enables image accelerator devices to be applied to tiled images.

Figure 4:
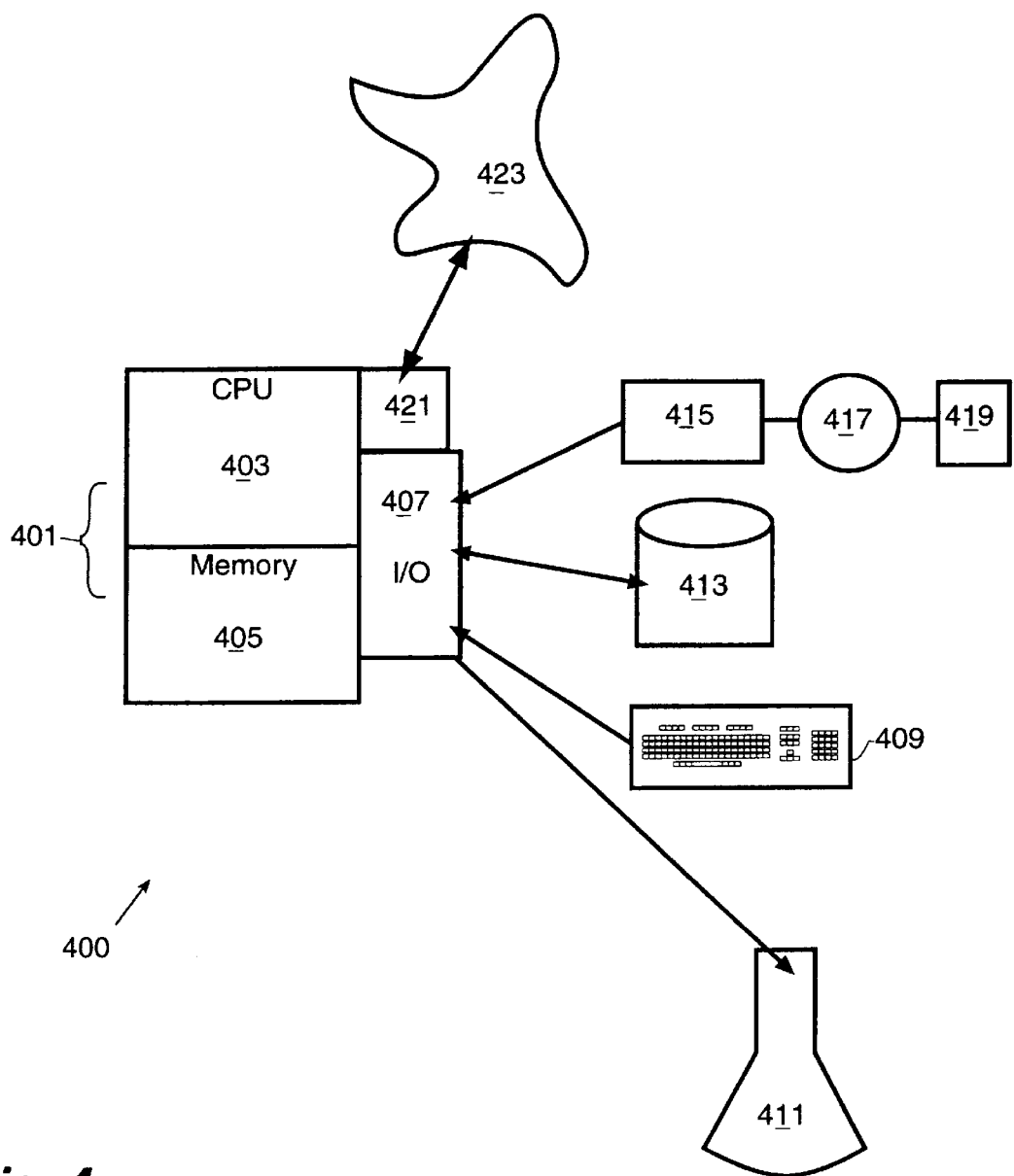
FIG. 4 illustrates a computer system capable of using the invention in accordance with a preferred embodiment.

The invention uses a computer. Some elements of a computer, as indicated by general reference character 400, that is configured to support the invention, are shown in FIG. 4. FIG. 4 shows a processor 401, including a central processor unit (CPU) 403, a memory section 405 and an input/output (I/O) section 407. The I/O section 407 is connected to a keyboard 409, a display unit 411, a disk storage unit 413 and a CD-ROM drive unit 415. The CD-ROM drive unit 415 can read a CD-ROM medium 417 that typically contains a program and data 419. The CD-ROM drive unit 415 along with the CD-ROM medium 417 and the disk storage unit 413 comprise a filestorage mechanism. The computer 400 also includes a network interface unit 421 that interfaces to a network 423. Such a computer system is capable of executing applications that embody the invention. One skilled in the art will recognize that not all the above computer components are required in each preferred embodiment.

Figure 5A:
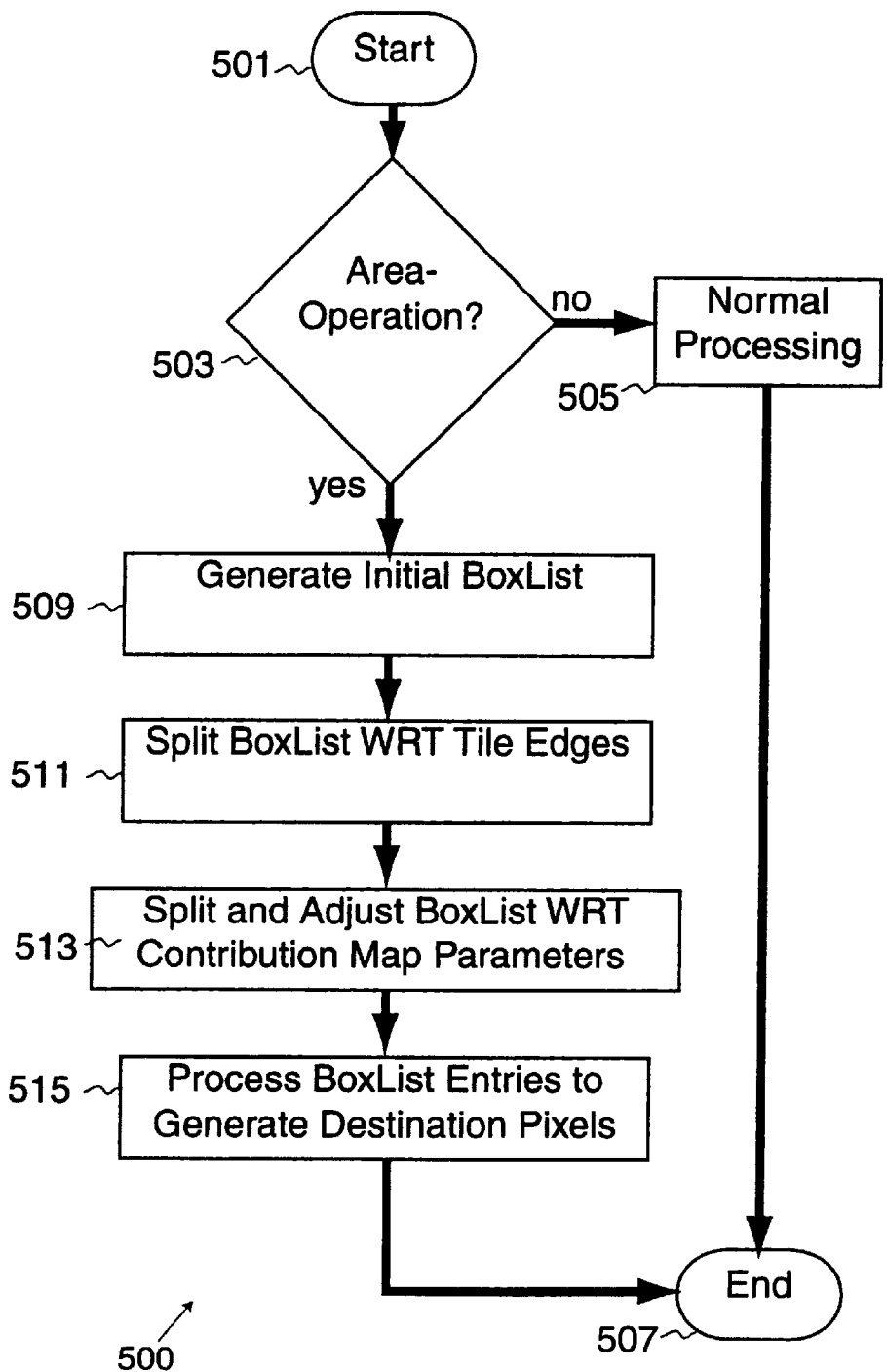
FIG. 5A illustrates an overview of the steps used to perform an area-image operation in accordance with a preferred embodiment.

FIG. 5A illustrates an image operation process, indicated by general reference character 500, for generating a destination image. The image operation process 500 generates the destination image, specified by a destination region that is passed to the image operation process 500, by applying an area-image operation and a source pixel contribution map parameter to a source region of a tiled source image. The image operation process 500 initiates at a 'start' terminal 501 and continues to an 'area-image operation' decision procedure 503 that determines whether the image operation being performed is an area-image operation that uses a source pixel contribution map or some other image operation. If the image operation is other than an area-image operation, the image operation process 500 continues to a 'normal operation' procedure 505 where the image operation is processed. Once processed, the image operation process 500 completes through an 'end' terminal 507. An example of a linear image operation is an add operation; an example of a geometric image operation is a rotation operation; an example of a linear area-image operation is a convolution operation or image filtering operation.

However, if the 'area-image operation' decision procedure 503 determines that the operation is an area-image operation, the image operation process 500 continues to a 'generate initial boxlist' procedure 509. The 'generate initial boxlist' procedure 509 creates the initial boxlist data structure (subsequently described with respect to FIG. 6A and FIG. 6B) used to drive the image processing procedures by processing the passed destination region. The initial boxlist data structure generally indicates the source region operated on as one or more source boxes, and the destination region generated by the image operation as a destination box. One skilled in the art will understand that some preferred embodiments will guarantee that the initial destination box is completely contained within a tile. In other preferred embodiments, the initial destination box will extend across multiple tiles. When the image operation is a linear operation, there is a one-to-one correspondence between a source pixel value and a destination pixel value represented by the boxes. One skilled in the art will understand that similar concepts and methods can be used with non-linear area-image operations (geometric operations).

After the initial boxlist data structure is created, the image operation process 500 continues to a 'split boxlist WRT tile edge' procedure 511. The 'split boxlist WRT tile edge' procedure 511 subdivides the initial boxes with respect to the tile edges (if required) in the boxlist data structure created by the 'generate initial boxlist' procedure 509. Thus, the 'split boxlist WRT tile edge' procedure 511 generates additional boxes and accordingly reduces the storage used by the initial boxes. The 'split boxlist WRT tile edge' procedure 511 is subsequently described with respect to FIG. 7. The result of the 'split boxlist WRT tile edge' procedure 511 is that none of the boxes in the resulting boxlist extend across tile boundaries. Thus for example, if the initial source box (created by the 'generate initial boxlist' procedure 509) entirely fits within a single tile, the source box would not be split. However, if the initial source box extended across a tile edge the initial source box would be split into a number of source boxes. None of the split source boxes would cross the tile edge (although some source boxes would be adjacent to a tile edge). The destination boxes are modified to maintain their mapping to pixel values in the modified source boxes.

Next, the image operation process 500 continues to an 'split and adjust boxlist WRT contribution map parameters' procedure 513. The 'split and adjust boxlist WRT contribution map parameters' procedure 513 is subsequently described with respect to FIG. 8 and splits the boxlist with respect to the tile edges to make boxes that are suitable for an area-image operation. The 'split and adjust boxlist WRT contribution map parameters' procedure 513 may create a source tile edge box that represents a source pixel contribution map that extends across a tile edge. The source tile edge box depends on the source pixel contribution map parameters used for the area-image operation. The 'split and adjust boxlist WRT contribution map parameters' procedure 513 may also create an image edge box that depends on the source pixel contribution map parameters as applied to an image edge of the tiled source image. Each of the resulting edge source boxes is appropriately tagged as an image edge box such that the image processing operation or buffer cobbling code can handle the pixel values that do not exist beyond the image edge.

At this point, the initial source and destination boxes have been split into an ordered grouping of source and destination boxes. The area-image operation is then applied to the boxes to generate corresponding pixel values in the destination image. This processing is performed by a 'process boxlist to generate destination' procedure 515 that applies the area-image operation to each destination box using the pixel values in the associated source boxes. The 'process boxlist to generate destination' procedure 515 is subsequently described with respect to FIG. 9. Then the image operation process 500 completes though the 'end' terminal 507.

Figure 5B:
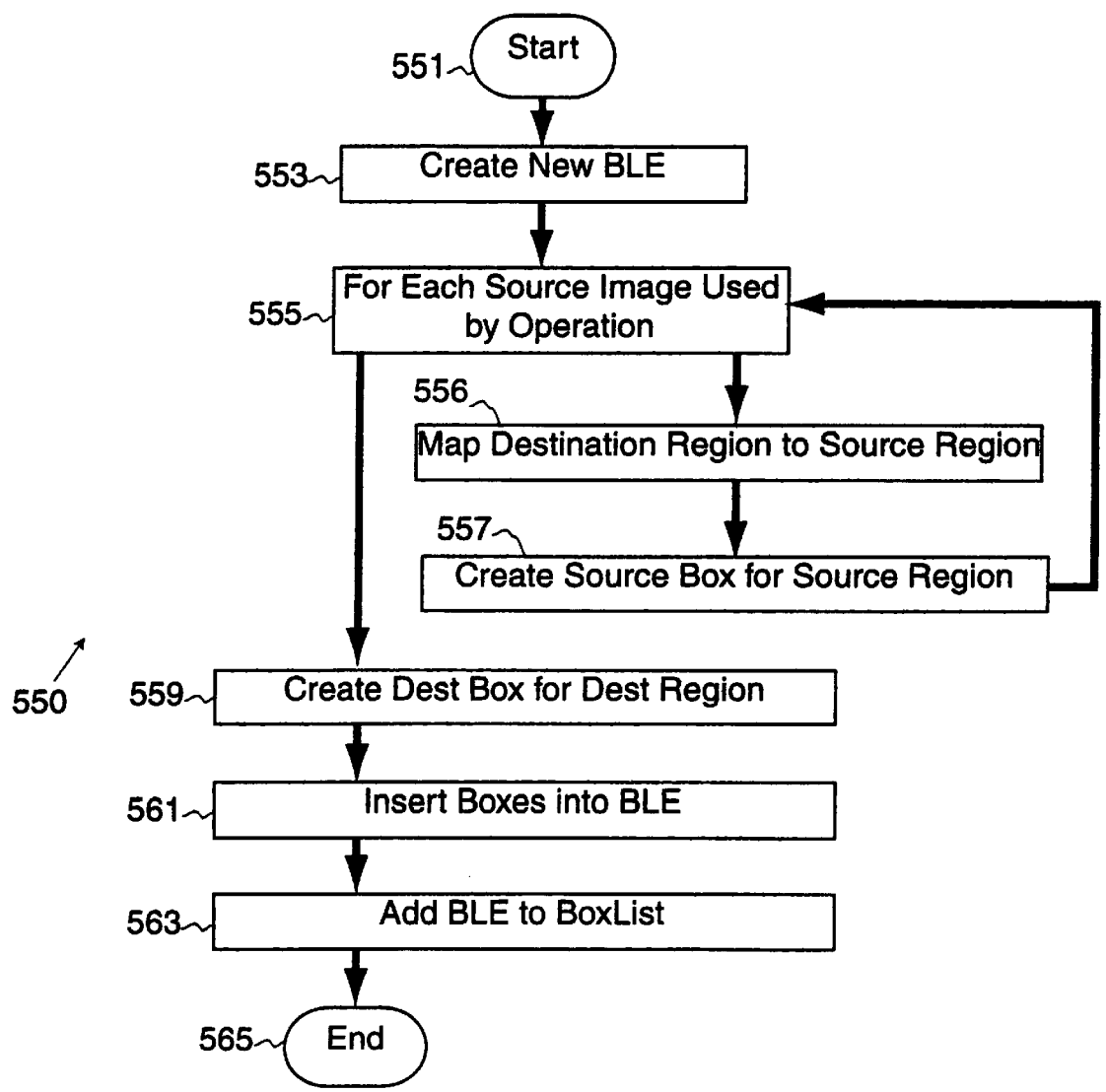
FIG. 5B illustrates steps used to generate an initial boxlist in accordance with a preferred embodiment.

FIG. 5B illustrates a 'generate initial boxlist' process, indicated by general reference character 550, invoked by the 'generate initial boxlist' procedure 509 of FIG. 5A. The 'generate initial boxlist' process 550 initiates at a 'start' terminal 551 and receives, as input, the destination region that will be the result of the area-image operation. The 'generate initial boxlist' process 550 continues to a 'create new BLE' procedure 553. The 'create new BLE' procedure 553 allocates and initializes a box list entry (BLE) data structure (the BLE data structure is subsequently described with respect to FIG. 6A). Then, an 'iterate operation sources' procedure 555 iterates each source region related to the image operation. A 'map destination region to source region' procedure 556 determines which region in the iterated source is required by the area-image operation to generate the specified destination region. Each source region has a corresponding source box created by a 'create source box' procedure 557. The box that is created is subsequently described with regards to FIG. 6A and FIG. 6B. After all the sources required by the area-image operation have been iterated, the 'generate initial boxlist' process 550 continues to a 'create destination box' procedure 559. The 'create destination box' procedure 559 creates a destination box that corresponds to the destination region in the image operation. Next, the boxes created by the 'create source box' procedure 557 and the 'create destination box' procedure 559 are inserted into the BLE by an 'insert boxes into BLE' procedure 561. Next, an 'add BLE to boxlist' procedure 563 adds the BLE to a 'boxlist' data structure as described with respect to FIG. 6A and the 'generate initial boxlist' process 550 completes through an 'end' terminal 565. One skilled in the art will understand that some embodiments may insert the boxes into the BLE as each box is created and that other equivalent data structures can be used to represent the boxlist, the BLE and the box data structures. One skilled in the art will understand that the details and sequences of the previously described source and destination box creation mechanism may be modified as required to operate within the selected image processing architecture.

Figure 6A:
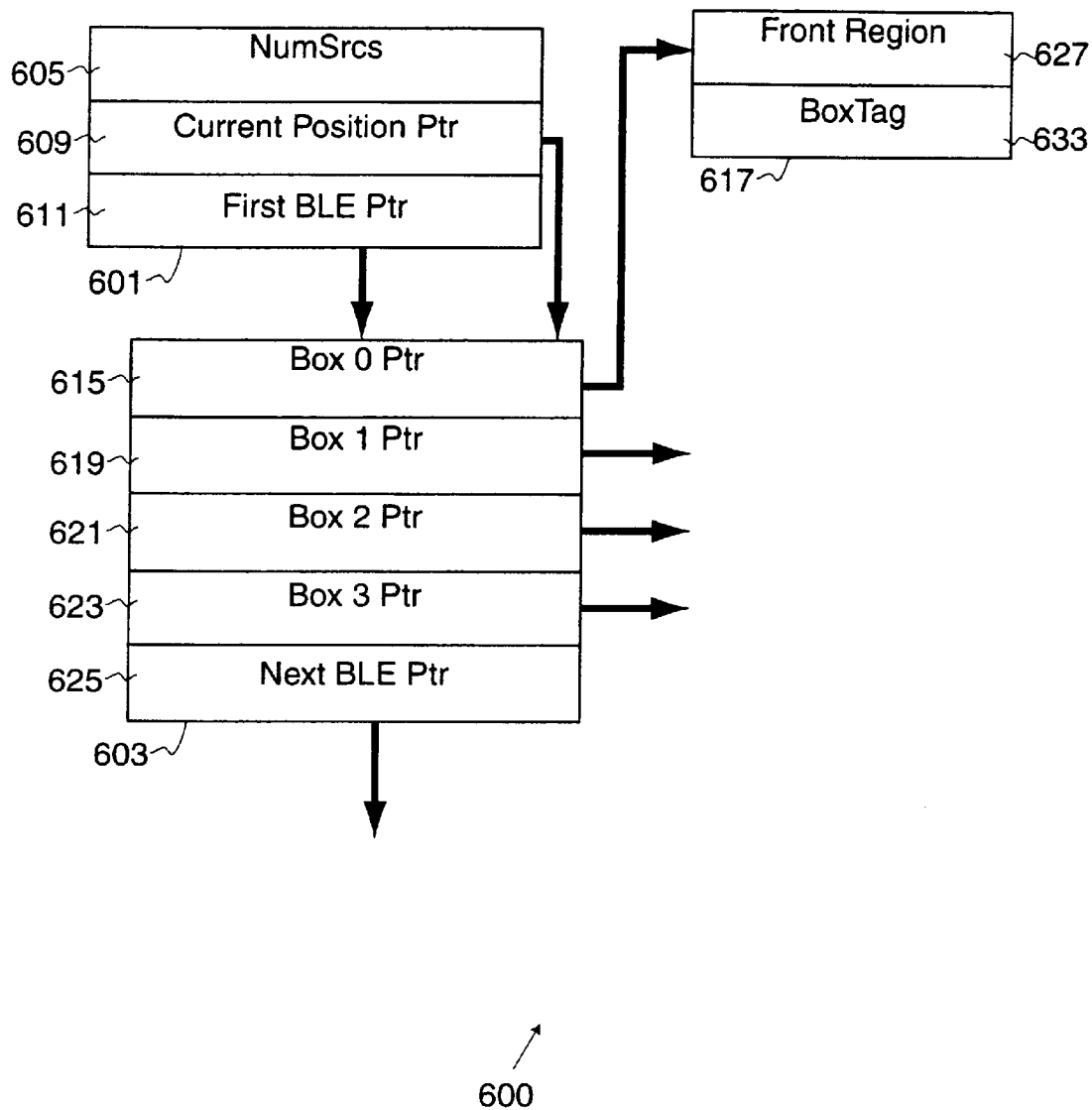
FIG. 6A illustrates a 'boxlist' data structure in accordance with a preferred embodiment.

FIG. 6A illustrates a 'boxlist' data structure, indicated by general reference character 600, that maintains a list of source and destination boxes for processing. The 'boxlist' data structure 600 contains a 'boxlist' header 601 that is the list header for a list that contains a 'boxlist' entry (BLE) 603. The 'boxlist' header 601 includes a 'number of sources' field 605 that contains the number of sources required for the area-image operation. A preferred embodiment assumes a single destination. In addition, the 'boxlist' header 601 contains a 'current position' field 609 that is a pointer to the current BLE. The contents of the 'current position' field 609 in FIG. 6A points to the initial BLE in the list. In addition, the 'boxlist' header 601 contains a 'first BLE pointer' field 611 that contains a pointer to the BLE 603 that is the first 'boxlist' entry in the list.

The BLE 603 contains a 'box 0 pointer' field 615 that contains a pointer to a box data structure 617 or NULL if no box data structure is allocated to that field. The BLE 603 also contains a 'box 1 pointer' field 619, a 'box 2 pointer' field 621, and a 'box 3 pointer' field 623. Although a preferred embodiment uses fixed size array storage for the box pointers, one skilled in the art will understand that a list of boxes or other well known data structures is equivalent. In a preferred embodiment the last non-null pointer in the pointer fields 615, 619, 621, 623 is a pointer to a destination box. The other box pointers reference source boxes. The BLE 603 also includes a 'next BLE pointer' field 625 that contains a pointer to the next BLE in the list; or NULL if the BLE is the last BLE on the list. One skilled in the art will understand that the 'boxlist' data structure 600 previously described is but one data structure that can be used to organize the boxlist representation and other data structures provide equivalent functionality.

The box data structure 617 includes a 'region' field 627 that represents the area of the image that is processed by the area-image operation. The storage that is required to process the area of the image is determinable from the contents of the 'region' field 627. However, area-image operations often require additional storage due to the need to include space to process tile edges when performing an area-image operation. This storage can be determined from the 'region' field 627 and the source pixel contribution map parameters. One skilled in the art will understand that the boxes do not contain the actual pixel value storage. Instead, when the area-image operation is invoked, the information in the boxes is used to allocate and load the required storage as is subsequently indicated with respect to FIG. 9.

Figure 6B:
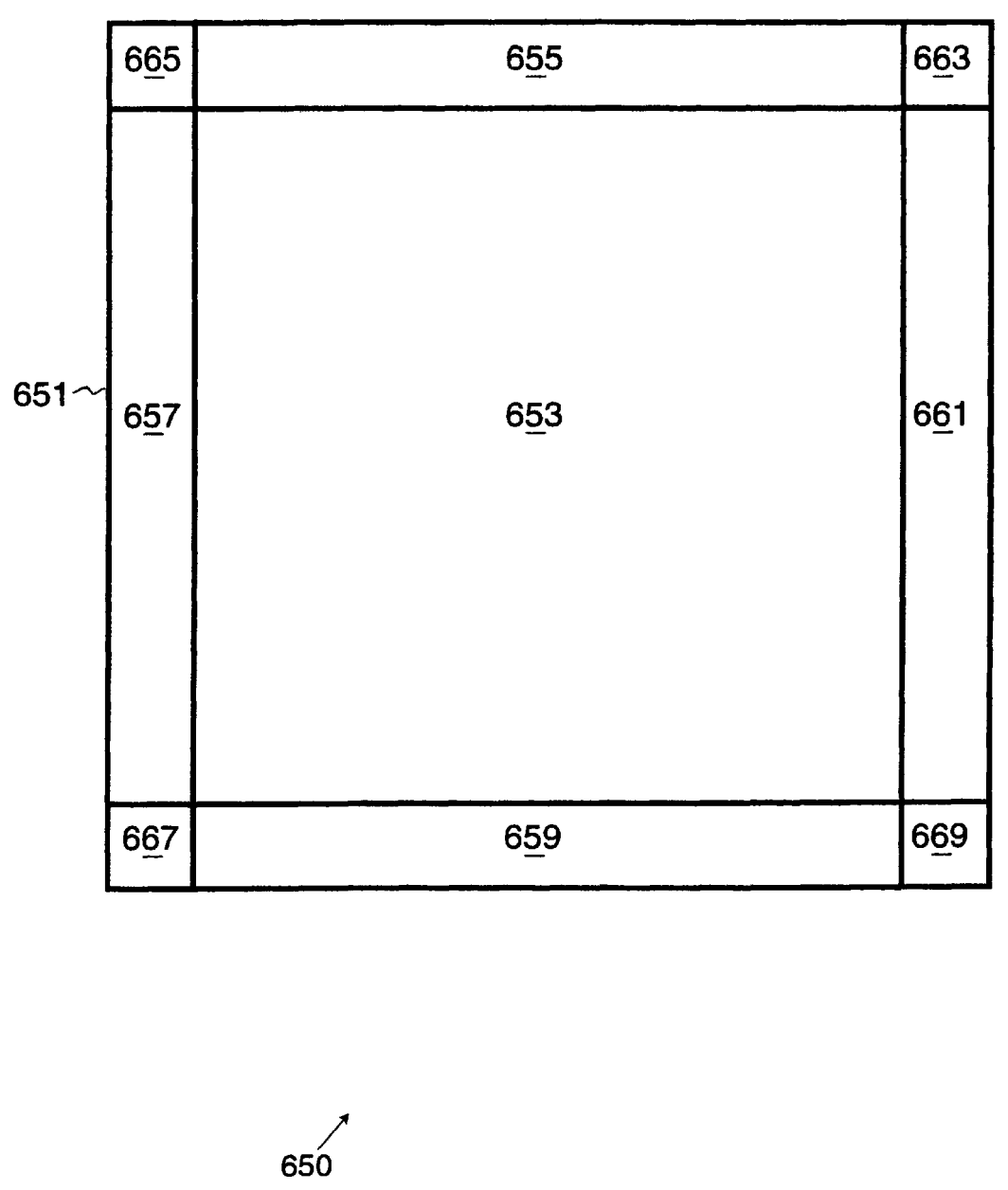

The box data structure 617 also includes a 'box tag' field 633 that indicates the box type represented by the box data structure 617. The 'box tag' field 633 contains a box tag value that identifies the box type as shown in FIG. 6B. The box type includes:
AREA_TOP_LEFT_CORNER, AREA_TOP_EDGE, AREA_TOP_RIGHT_CORNER, AREA_LEFT_EDGE, AREA_BOTTOM_LEFT_CORNER, AREA_CENTER, AREA_BOTTOM_RIGHT_CORNER, AREA_RIGHT_EDGE, and IMAGE_EDGE.

The IMAGE_EDGE type indicates that the box is on an image edge and that no tile exists to obtain sufficient pixel data to perform the area-image operation.

One skilled in the art will understand that the boxlist data structure and the BLEs can be implemented using many equivalent techniques and that the invention is not limited to the particular data structures previously discussed. One aspect of the invention processes each of the above box types and, for an area-image operation, converts each box into a center box. Thus, each box has sufficient pixel values so that the area-image operation can correctly apply the source pixel contribution map to the box.

FIG. 6B illustrates an image tile diagram, indicated by general reference number 650, showing how boxes representing portions of an image tile 651 are typed by the previously described box tags. One portion of the image tile 651 is referenced by a 'center' box 653. The 'center' box 653 represents the portion of the image tile 651 that can be directly processed by the area-image operation using the source pixel contribution map without accessing pixel values from outside the image tile 651. Thus, no cobbling is required to fully perform the area-image operation using the source pixel contribution map on the data in the image tile 651 represented by the 'center' box 653. A 'top edge' box 655 represents pixel values in the image tile 651 that cannot be processed by the area-image operation using the source pixel contribution map without accessing pixel values beyond the top of the 'top edge' box 655. The image tile 651 also includes a 'left edge' box 657, a 'bottom edge' box 659, and a 'right edge' box 661 each box representing portions of the image tile 651 that requires accessing pixel values that extend past one side of the box and outside of the image tile 651.

The image tile 651 also contains a 'top-right corner' box 663 that presents pixel values in the image tile 651 that cannot be processed by the area-image operation using the source pixel contribution map without accessing the pixel values beyond the top and without accessing the pixel values beyond the right of the 'top-right corner' box 663. The image tile 651 also contains a 'top-left corner' box 665, a 'bottom-left corner' box 667, and a 'bottom-right corner' box 669 each box representing portions of the image tile 651 that requires accessing pixel values that extend past two sides of the box and outside of the image tile 651.

The edge and corner boxes from adjacent tiles are aggregated to accommodate the combined extent of the source pixel contribution map as applied to either tile's edge.

One skilled in the art will understand how to use parameters of a source pixel contribution map, such as indicated by FIG. 2, and the region specified by the contents of the 'region' field 627 to determine the memory required to store the pixel values for the box. Such a one will also understand how to classify boxes.

Figure 7:
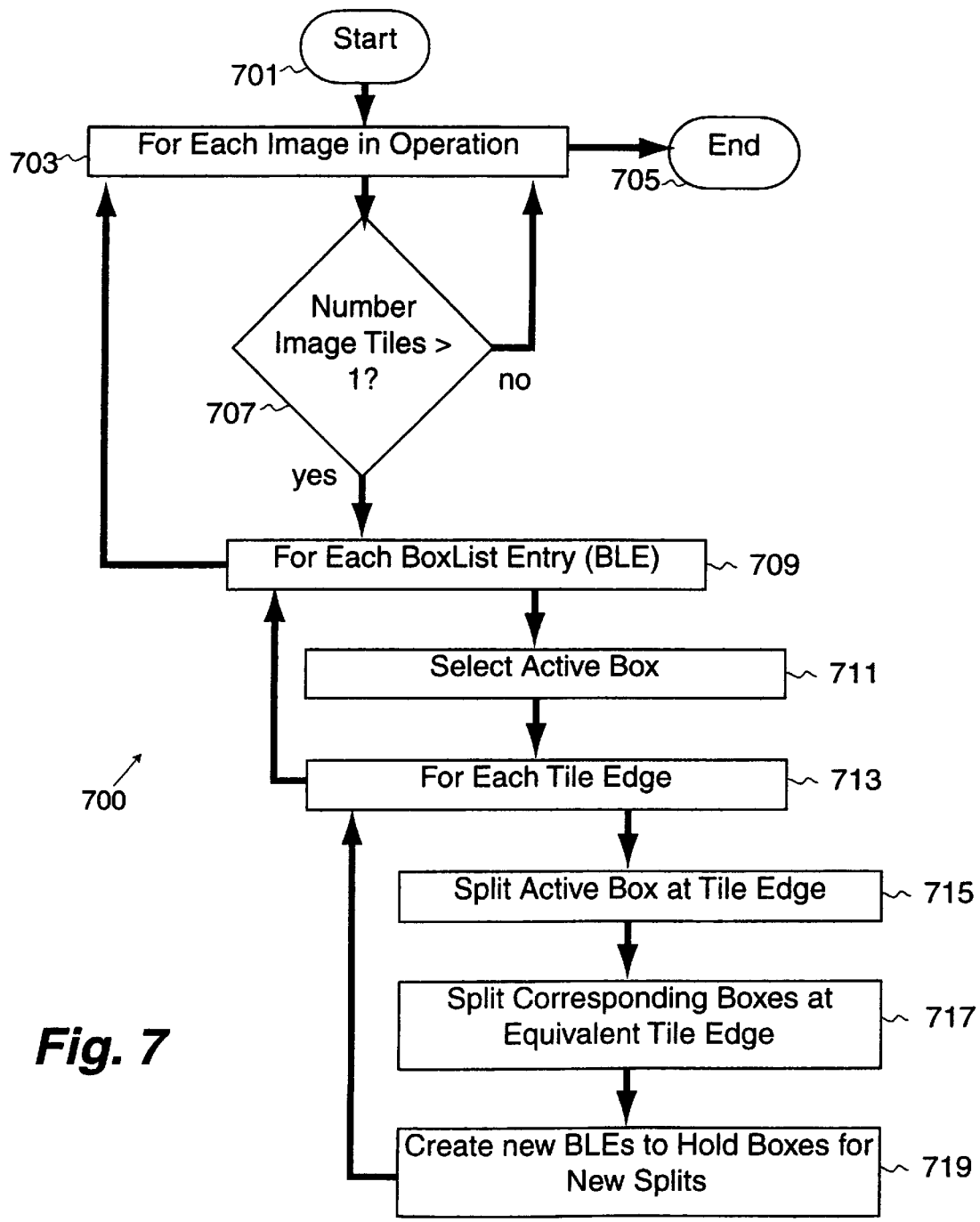
FIG. 7 illustrates a box splitting process in accordance with a preferred embodiment.

FIG. 7 illustrates a 'split box on tile edge' process, indicated by general reference character 700, that splits the boxes created by the 'generate initial boxlist' procedure 509 along tile boundaries. Thus, the 'split box on tile edge' process 700 takes one or more destination boxes and one or more associated source boxes and splits these boxes so that the boxlist only contains boxes that do not cross tile edges. This boxlist will be provided as input to the area-image operation after all splits are accomplished. The 'split box on tile edge' process 700 is invoked by the 'split boxlist WRT tile edge' procedure 511 of FIG. 5A and initiates at a 'start' terminal 701. After initiation, the 'split box on tile edge' process 700 continues to an 'iterate image' procedure 703 that iterates each image in the area-image operation. Once the 'iterate image' procedure 703 completes iteration, the 'split box on tile edge' process 700 completes through an 'end' terminal 705.

Each box that is iterated by the 'iterate image' procedure 703 is first checked by a 'more than 1 image tile in box' decision procedure 707 that determines whether the iterated box could extend across a tile edge. The box could possibly extend across the tile edge if the box references more than one tile. If the box could not possibly extend across a tile edge, the 'split box on tile edge' process 700 cannot further split the box and so continues to the 'iterate image' procedure 703 to iterate the next box. A preferred embodiment assures that the destination box does not reference more than one tile. Another preferred embodiment accepts destination boxes that extend across destination tiles and splits the destination boxes appropriately.

However, if the box contains more than one tile, the 'split box on tile edge' process 700 continues to an 'iterate BLEs' procedure 709 that iterates each BLE on the boxlist. When all the BLEs on the BLE list are processed, the 'split box on tile edge' process 700 returns to the 'iterate image' procedure 703.

Otherwise, each iterated BLE is processed by a 'select active box' procedure 711 that selects a box used by the area-image operation. Then, an 'iterate tile edge' procedure 713 iterates each tile edge in the active box. When all tile edges in the active box have been iterated the 'split box on tile edge' process 700 continues to the 'iterate BLEs' procedure 709 to process the next BLE.

Each tile edge iterated by the 'iterate tile edge' procedure 713 is processed by a 'split active box at edge' procedure 715 to create new boxes that do not contain a tile edge and to adjust the active box responsive to the new boxes. The active box is split by adjusting the value in the 'region' field 627 of the active box so that the active box represents the pixel values from the start of the active box to the last pixel value prior to the tile edge. A new box is created (a split box) that extends from the tile edge to the end of the active box. The process is applied to both "vertical" and "horizontal" tile edges.

There is a mapping from source to source and source to destination. A 'split corresponding boxes' procedure 717 makes equivalent split boxes for other corresponding source boxes (if any) and the destination box(es) as required.

Once the split boxes are created, a 'create new BLEs for new splits' procedure 719 creates new BLEs for the newly created split boxes and adds these boxes to the boxlist. The 'create new BLEs for new splits' procedure 719 also adjusts the 'current position' field 609, and other entries in the boxlist header as required so that the split boxes can be further split. The 'split box on tile edge' process 700 then continues to the 'iterate tile edge' procedure 713 to continue processing other tile boundaries. Each source box is tagged as indicated in FIG. 6B.

Figure 8:
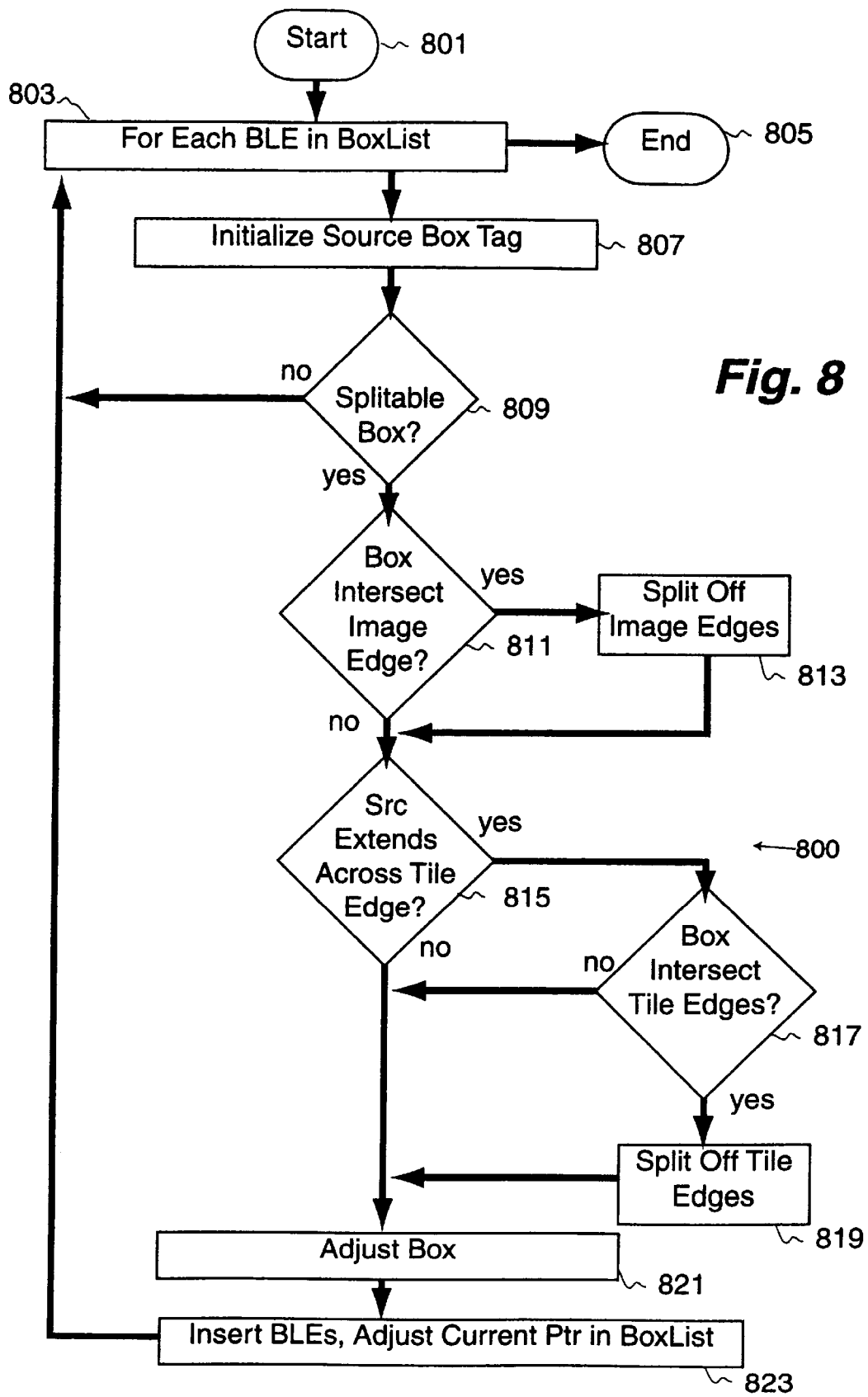
FIG. 8 illustrates an area related box splitting process in accordance with a preferred embodiment.

FIG. 8 illustrates an 'area split box on tile edge' process, indicated by general reference character 800, that additionally splits the boxes in the boxlist taking into account source pixel contribution map parameters. The 'area split box on tile edge' process 800 results in each source box tagged as a non-center box, or as a center box having sufficient pixel values to perform the area-image operation using the source pixel contribution map for the operation. The 'area split box on tile edge' process 800 is invoked by the 'split and adjust boxlist WRT contribution map parameters' procedure 513 of FIG. 5A and initiates at a 'start' terminal 801. The 'area split box on tile edge' process 800 continues to an 'iterate each BLE' procedure 803 that iterates each BLE in the boxlist. When all BLEs have been iterated by the 'iterate each BLE' procedure 803 the 'area split box on tile edge' process 800 completes through an 'end' terminal 805.

As each BLE is iterated by the 'iterate each BLE' procedure 803 the source boxes referenced by the BLE are initialized by an 'initialize source box tag' procedure 807 as a center box. The destination boxes are not examined to determine area splits because the storage required by a destination box is fully described. However, notice that the destination box will be split responsive to splits made in the corresponding source boxes. Next the 'area split box on tile edge' process 800 continues to a 'splitable source box' decision procedure 809 that determines whether the source box can be split. If the source box cannot be split, the 'area split box on tile edge' process 800 continues to the 'iterate each BLE' procedure 803 to iterate the next BLE. The 'splitable source box' decision procedure 809 determines whether the source box is too small to split (for example, if the source box is only one pixel value or if the source box is smaller than the source pixel contribution map).

If the source box can be split, the 'area split box on tile edge' process 800 continues to a 'does box intersect an image edge' decision procedure 811. The 'does box intersect an image edge' decision procedure 811 determines whether the source box and source pixel contribution map area intersects the image edge. If the source box, as modified by the source pixel contribution map parameters, intersects the image edge, the 'area split box on tile edge' process 800 continues to a 'split off image edge' procedure 813.

The 'split off image edge' procedure 813 splits off the image edges from the source box. This is accomplished by splitting off the image edges and corners into correspondingly tagged boxes. The split boxes (the image edge boxes) are tagged as being IMAGE_EDGE because the expanded split box would extend past the image edge. Alternatively, these boxes can be tagged as CENTER boxes if the cobbling process handles the image edge characteristics by replicating the image edge or by filling the required space with a specified value. Corresponding splits are made in the destination box.

At this point, the source box (as adjusted by the source pixel contribution map) does not intersect any image edge. However, the source box (adjusted by the source pixel contribution map) may cross tile edges because the effective area of the source box has been expanded according to the source pixel contribution map parameters. The 'area split box on tile edge' process 800 then continues to a 'source extends across tile edge' decision procedure 815. The 'source extends across tile edge' decision procedure 815 again checks the source tile (as adjusted by the source pixel contribution map parameters) to determine if the adjusted source box could possibly extend across a tile edge. If the adjusted source box could extend across the tile edge, the 'area split box on tile edge' process 800 continues to a 'box intersect tile edges' decision procedure 817 that determines whether the source box (as adjusted by the source pixel contribution map parameters) extends across a tile edge. If the adjusted source box extends across the tile edge the 'area split box on tile edge' process 800 continues to a 'split off tile edges' procedure 819. The 'split off tile edges' procedure 819 splits off the tile edges from the source box and creates new boxes referencing the tile edges. The new boxes are classified as edge or corner boxes as shown in FIG. 6B. Each of these boxes is classified by storing the appropriate value in the 'box tag' field 633.

If the box did not intersect any tile edge, or after the tile edges were split off by the 'split off tile edges' procedure 819, the 'area split box on tile edge' process 800 continues to an 'adjust box' procedure 821. The 'adjust box' procedure 821 specifies the amount of storage needed for the box as adjusted by the source pixel contribution map parameters and sets the value of the 'region' field 627 accordingly. Thus, the original box that has been reduced corresponding to the boxes split off as edges and corners is reduced by a corresponding amount without causing the source pixel contribution map to extend past available pixel values.

Next the 'area split box on tile edge' process 800 continues to an 'insert BLEs and adjust current BLE pointer' procedure 823. The 'insert BLEs and adjust current BLE pointer' procedure 823 inserts the newly created BLEs and adjusts the contents of the 'current position' field 609 to point past the just inserted BLEs. The 'area split box on tile edge' process 800 then continues to the 'iterate each BLE' procedure 803 to continue processing.

Figure 9:
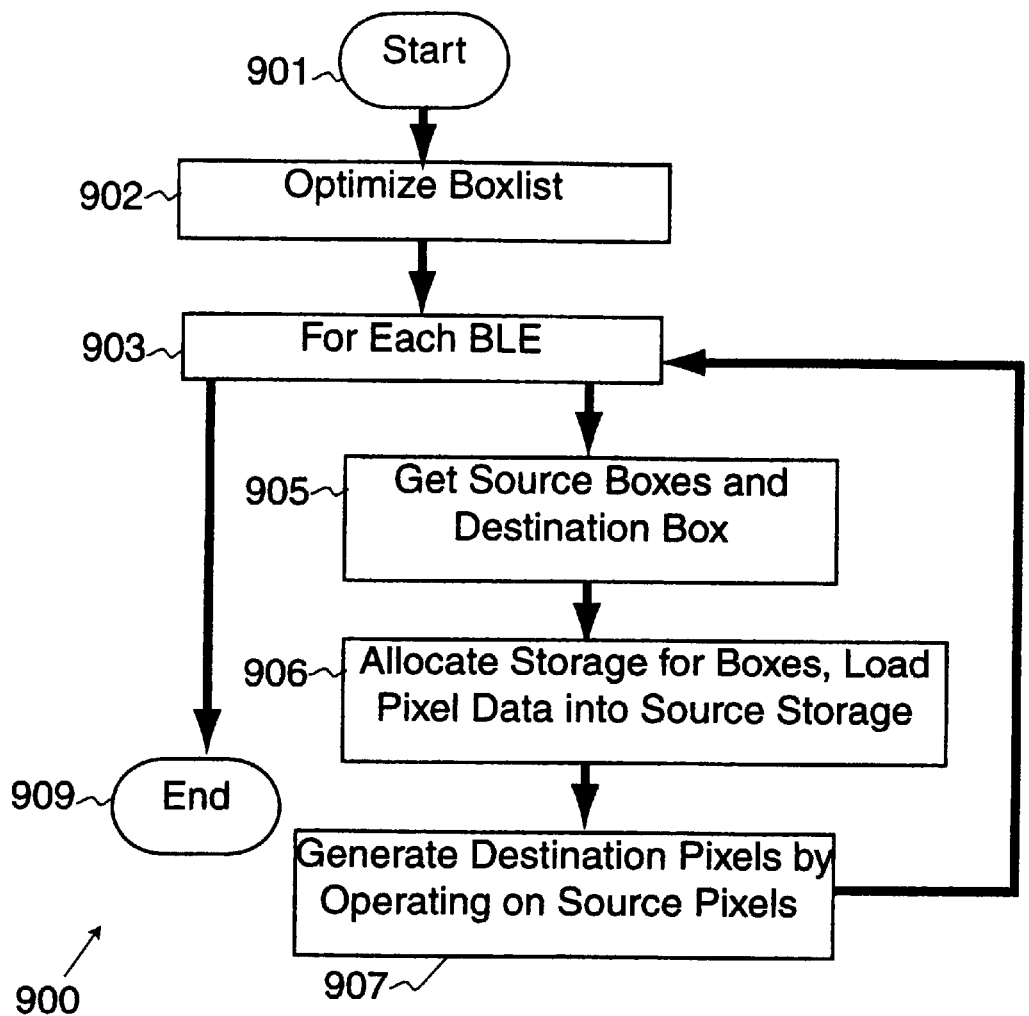
FIG. 9 illustrates how an area-image operation operates on a boxlist in accordance with a preferred embodiment.

FIG. 9 illustrates an area-image operation process, indicated by general reference character 900, used to apply an area-image operation to the pixel values in the source boxes to generate the pixel values in the destination box. The area-image operation process 900 is invoked by the 'process boxlist to generate destination' procedure 515 of FIG. 5A and initiates at a 'start' terminal 901. The area-image operation process 900 continues to a 'sort boxlist' procedure 902 that sorts the BLEs in the boxlist to optimize access to adjacent tiles for cobbling purposes. Then the area-image operation process 900 continues to a 'BLE iteration' procedure 903 that iterates each BLE in the boxlist. Each iterated BLE is processed by a 'get boxes from BLE' procedure 905 that obtains the appropriate box information from the BLE's boxes. Then a 'allocate storage and load source' procedure 906 allocates memory buffers for each non-center box using data in the 'region' field 627. Then, the 'allocate storage and load source' procedure 906 loads source tiles into memory and cobbles the source box storage as appropriate. Notice that a CENTER box does not require cobbling and thus, a center box used as a source box needs no additional storage other than the storage required to load the tile that contains the pixel values associated with the center box. Non-center boxes however require cobbling. Thus, pixel storage is allocated for the non-center boxes and filled with pixel data copied from one or more adjacent tiles as appropriate. Each non-center box results in a buffer large enough to hold the pixels required by the source pixel contribution map. These pixel values for these buffers are cobbled from pixel values in the original tile along with adjacent tiles to form a buffer that contains the pixel values required by the area-image operation to generate the destination pixel value. Notice that the cobbled buffers for edge and corner boxes only copy a very small amount of data from the image tiles to these buffers. One skilled in the art will understand that because pixel values from both sides of a tile edge need to be processed the cobbled buffer contains sufficient pixel values to accommodate the source pixel contribution map as applied to either tile.

Next, a 'generate destination pixel values' procedure 907 applies the area-image operation to the pixel values in buffers associated with the source boxes to generate the pixel values in the buffer associated with the destination box in the iterated BLE. When all the BLEs in the boxlist have been iterated, the area-image operation process 900 completes through an 'end' terminal 909. Because each buffer that is associated with a box contains all the required pixel values required to perform the area-image operation, these buffers can be processed using tile-unaware techniques such as provided by existing image processing technology.

One skilled in the art will understand that the invention defines a list of boxes that either reference pixel values in a tile that can be operated on by an area-image operation without cobbling, or define the minimum amount of storage that must be cobbled and thus reduces the amount of data transferred between memory buffers. The invention also simplifies the programming required to process images that cross tile edges by defining boxes that represent center areas. Thus, special case code required to process images that cross tile edges is no longer necessary. Because this special case code is not required, the invention enables image processing hardware and expanded computer instruction sets to implement area-image operations more efficiently than does the prior art.

From the foregoing, it will be appreciated that the invention has (without limitation) the following advantages:

1) The invention minimizes the amount of data that is copied from one buffer to another during the cobbling of tile edges for area-image operations.

2) The invention minimizes the contiguous memory buffer required to cobble edges of a tiled image for area-image operations.

3) The invention enables the use of simplified area-image operations in that each center box represents a pixel buffer that can be operated on by code that is not special-cased for crossing tile edges. Thus, the code is more efficient than that available to the prior art and can readily be implemented by using specialized image processing hardware or specialized CPU instructions such as Sun's VIS or Intel's MMX accelerated CPU-based instruction sets.

4) The invention orders the boxlist so that area-image operations can be performed with a minimal number of disk accesses to load and unload source tiles from disk.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for generating a destination image by application of an area-image operation that uses a source pixel contribution map parameter to process a tiled source image, said method comprising steps of:

(b) creating a plurality of boxes representing a destination region and a source region, each of said plurality of boxes respectively identified as either a source box or a destination box;

(c) splitting said plurality of boxes so that each of said plurality of boxes does not extend across a tile edge; and (d) creating at least one source tile edge box, dependent on said source pixel contribution map parameter, extending across said tile edge.

2. The computer controlled method of claim 1 wherein step (c) further comprises:

(c1) classifying each of said plurality of boxes to indicate that each box is tagged with a box tag wherein said box tag is selected from the group consisting of a center box, a left-edge box, a right-edge box, a top-edge box, a bottom-edge box, a left-top-corner box, a right-top-corner box, a left-bottom corner box, a right-bottom-corner box and an image-edge box.

3. The computer controlled method of claim 1 wherein step (c) further comprises:

(c2) creating an image edge box, dependent on said source pixel contribution map parameter, extending across an image edge of said tiled source image.

4. The computer controlled method of claim 1 wherein step (d) further comprises:

(d1) allocating a memory buffer associated with said source tile edge box; and (d2) copying a portion of image data from an adjacent tile, adjacent to said tile edge, to said memory buffer, said portion of image data determined using said source pixel contribution map parameter.

5. The computer controlled method of claim 1 further comprising:

(a) specifying said destination region and said source region for said area-image operation.

6. The computer controlled method of claim 1 further comprising:

(e) applying said area-image operation to said plurality of boxes to generate said destination image.

7. The computer controlled method of claim 6 wherein step (e) comprises steps of:

(e1) preparing one or more memory buffers dependant on said plurality of boxes; and (e2) applying said area-image operation to said one or more memory buffers where said area-image operation is a tile-unaware process.

8. An apparatus having a central processing unit (CPU) and a memory coupled to said CPU for generating a destination image by application of an area-image operation that uses a source pixel contribution map parameter to process a tiled source image, said apparatus comprises:

a box creation mechanism configured to create a plurality of boxes representing a destination region and a source region, each of said plurality of boxes respectively identified as either a source box or a destination box;

a box splitting mechanism configured to split said plurality of boxes created by the box creation mechanism so that each of said plurality of boxes does not extend across a tile edge; and an edge box creation mechanism configured to create at least one source tile edge box, dependent on said source pixel contribution map parameter, extending across said tile edge, the edge box creation mechanism responsive to the box splitting mechanism.

9. The apparatus of claim 8 wherein the box splitting mechanism further comprises:

a box classification mechanism configured to classify each of said plurality of boxes to indicate that each box is tagged with a box tag wherein said box tag is selected from the group consisting of a center box, a left-edge box, a right-edge box, a top-edge box, a bottom-edge box, a left-top-corner box, a right-top-corner box, a left-bottom corner box, a right-bottom-corner box and an image-edge box.

10. The apparatus of claim 8 wherein the box splitting mechanism further comprises:

an image box creation mechanism configured to create an image edge box, dependent on said source pixel contribution map parameter, extending across an image edge of said tiled source image.

11. The apparatus of claim 8 wherein the edge box creation mechanism further comprises:

a memory allocation mechanism configured to allocate a memory buffer associated with said source tile edge box; and a memory copy mechanism configured to copy a portion of image data from an adjacent tile, adjacent to said tile edge, to said memory buffer, said portion of image data determined using said source pixel contribution map parameter.

12. The apparatus of claim 8 further comprising:

a specification mechanism configured to specify said destination region and said source region for said area-image operation.

13. The apparatus of claim 8 further comprising:

an application mechanism configured to apply said area-image operation to said plurality of boxes to generate said destination image.

14. The apparatus of claim 13 wherein the application mechanism comprises:

a buffer allocation mechanism configured to prepare one or more memory buffers dependant on said plurality of boxes; and an image processing mechanism configured to apply said area-image operation to said one or more memory buffers where said area-image operation is performed by a tile-unaware process.

15. A computer program product comprising:

a computer usable storage medium having computer readable code embodied therein for causing a computer to generate a destination image by application of an area-image operation that uses a source pixel contribution map parameter to process a tiled source image, said computer readable code comprising:

computer readable program code configured to cause said computer to effect a box creation mechanism configured to create a plurality of boxes representing a destination region and a source region, each of said plurality of boxes respectively identified as either a source box or a destination box;

computer readable program code configured to cause said computer to effect a box splitting mechanism configured to split said plurality of boxes created by the box creation mechanism so that each of said plurality of boxes does not extend across a tile edge; and computer readable program code configured to cause said computer to effect an edge box creation mechanism configured to create at least one source tile edge box, dependent on said source pixel contribution map parameter, extending across said tile edge, the edge box creation mechanism responsive to the box splitting mechanism.

16. The computer program product of claim 15 wherein the box splitting mechanism further comprises:

computer readable program code configured to cause said computer to effect a box classification mechanism configured to classify each of said plurality of boxes to indicate that each box is tagged with a box tag wherein said box tag is selected from the group consisting of a center box, a left-edge box, a right-edge box, a top-edge box, a bottom-edge box, a left-top-corner box, a right-top-corner box, a left-bottom corner box, a right-bottom-corner box or an image-edge box.

17. The computer program product of claim 15 wherein the box splitting mechanism further comprises:

computer readable program code configured to cause said computer to effect an image box creation mechanism configured to create an image edge box, dependent on said source pixel contribution map parameter, extending across an image edge of said tiled source image.

18. The computer program product of claim 15 wherein the edge box creation mechanism further comprises:

computer readable program code configured to cause said computer to effect a memory allocation mechanism configured to allocate a memory buffer associated with said source tile edge box; and computer readable program code configured to cause said computer to effect a memory copy mechanism configured to copy a portion of image data from an adjacent tile, adjacent to said tile edge, to said memory buffer, said portion of image data determined using said source pixel contribution map parameter.

19. The computer program product of claim 15 further comprising:

computer readable program code configured to cause said computer to effect a specification mechanism configured to specify said destination region and said source region for said area-image operation.

20. The computer program product of claim 15 further comprising:

computer readable program code configured to cause said computer to effect an application mechanism configured to apply said area-image operation to said plurality of boxes to generate said destination image.

21. The computer program product of claim 20 wherein the application mechanism comprises:

computer readable program code configured to cause said computer to effect a buffer allocation mechanism configured to prepare one or more memory buffers dependant on said plurality of boxes; and computer readable program code configured to cause said computer to effect an image processing mechanism configured to apply said area-image operation to said one or more memory buffers where said area-image operation is performed by a tile-unaware process.

22. A computer program product comprising:

a computer data signal embodied in a carrier wave having computer readable code embodied therein for causing a computer to generate a destination image by application of an area-image operation that uses a source pixel contribution map parameter to process a tiled source image, said computer readable code comprising:

computer readable program code configured to cause said computer to effect a box creation mechanism configured to create a plurality of boxes representing a destination region and a source region, each of said plurality of boxes respectively identified as either a source box or a destination box;

computer readable program code configured to cause said computer to effect a box splitting mechanism configured to split said plurality of boxes created by the box creation mechanism so that each of said plurality of boxes does not extend across a tile edge; and computer readable program code configured to cause said computer to effect an edge box creation mechanism configured to create at least one source tile edge box, dependent on said source pixel contribution map parameter, extending across said tile edge, the edge box creation mechanism responsive to the box splitting mechanism.

* * * * *

UNITED STATES PATENT AND TRADEMARK OFFICE
CERTIFICATE OF CORRECTION

PATENT : 6,064,408
DATED : 5/16/2000
INVENTOR(S) : FURLANI, et al.

It is certified that error appears in the above-identified patent and that said Letters Patent is hereby corrected as shown below:

IN THE TITLE: item [54] and col. 1,

PLEASE DELETE THE WORD "AN" BETWEEN "FROM" AND "IMAGE".

"METHOD, APPARATUS & COMPUTER PROGRAM PRODUCT FOR ELIMINATING EDGE CONDITIONS FROM AREA IMAGE PROCESSING OPERATIONS ON TILED IMAGE DATA"

Signed and Sealed this

Twentieth Day of March, 2001

Attest:

NICHOLAS P. GODICI

*Attesting Officer*    Acting Director of the United States Patent and Trademark Office